March 26, 1957  C. USCHMANN  2,786,820
SULFITE LIQUOR DERIVATIVES AND PROCESSES
Filed Feb. 18, 1952
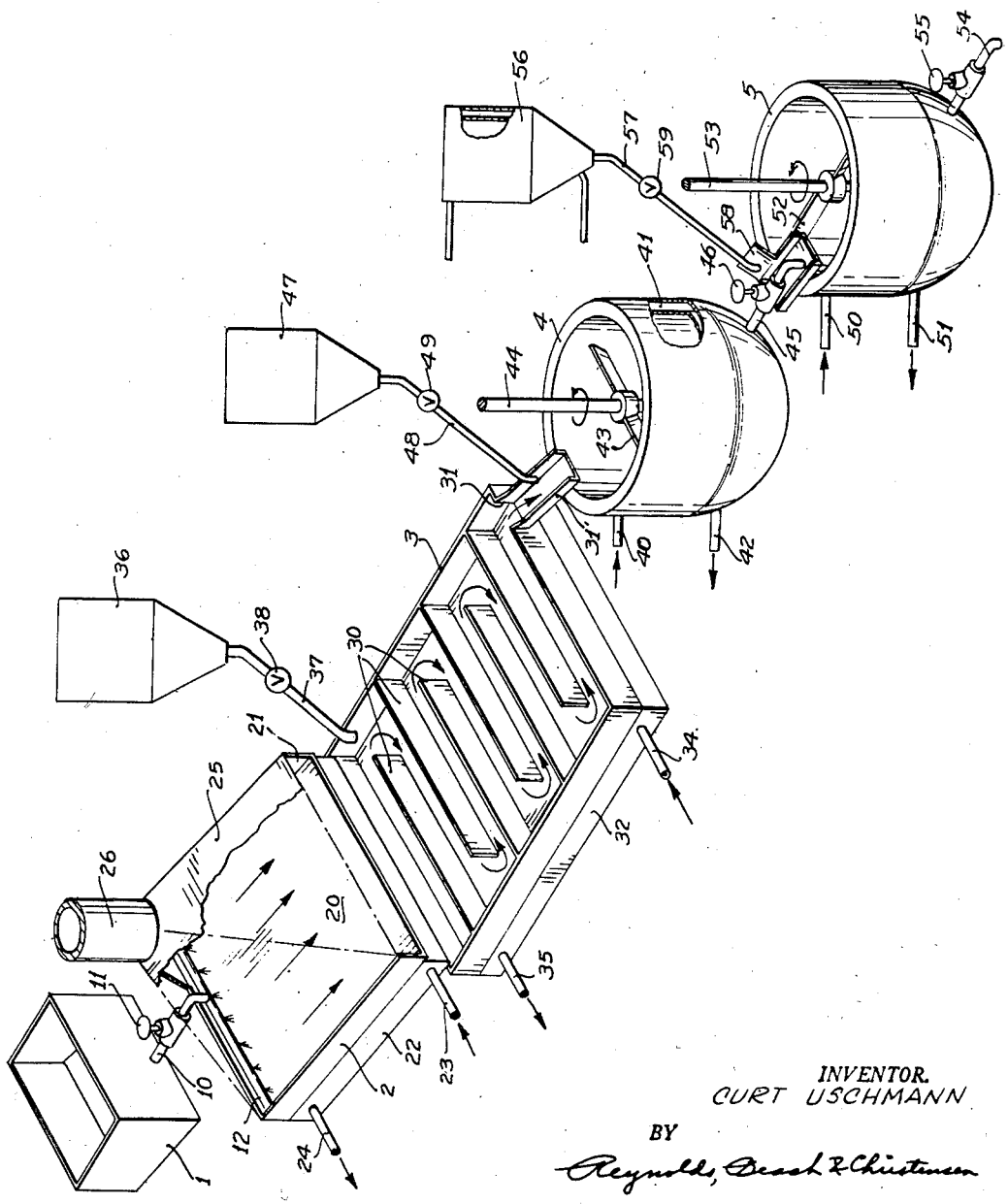
INVENTOR.
CURT USCHMANN
BY
Reynolds, Beach & Christensen
ATTORNEYS

United States Patent Office 2,786,820
Patented Mar. 26, 1957

2,786,820

SULFITE LIQUOR DERIVATIVES AND PROCESSES

Curt Uschmann, Lebanon, Oreg., assignor to Cascades Plywood Corporation, Portland, Oreg., a corporation of Delaware Application February 18, 1952, Serial No. 272,159

20 Claims. (Cl. 260—17.2)

This invention relates to a derivative of waste liquor of the sulfite pulp manufacturing process. Such derivative may be utilized in various applications and may be modified in different ways, as most suitable for such applications. This application is a continuation-in-part of my application Serial No. 779,465 resulting in United States Patent No. 2,585,977 for Sulfite Liquor Treating Process and Product.

The derivative in itself or in modified form is useful as a varnish base, as a moldable plastic, as a hardening medium for synthetic rubber products, as a synthetic substitute for natural rubber and as a thermosetting binder for various purposes, either alone or in conjunction with other commercially available adhesives, and is particularly valuable for mixing with metallic pigments to afford colors resistant to fading and which can be used as an ingredient of a phenol-formaldehyde resin binder and pigment mix to render the phenol-formaldehyde resin and pigment compatible, and thereby prevent appreciable fading.

Either by itself or mixed with other binders the sulfite liquor derivative may be utilized advantageously in fabricating wood products, such as wallboard, synthetic lumber, and a variety of pressed or molded articles using woody material fibers procured from wood waste, bagasse, corn stalks, etc., or for bonding veneer sheets in the manufacture of plywood and in veneering furniture.

It is a particular object of my process to employ a treatment procedure which, while being effective to convert the useful ingredients of the sulfite waste liquor into binder material, can be carried out economically by utilizing simple equipment, by adding to the liquor in the recovery process only small amounts of inexpensive materials, and by accomplishing the refining treatment in a short period of time.

Depending upon the particular purpose for which the resultant binder is to be used, the process may be varied to alter the proportions or types of ingredients added to the sulfite liquor during the recovery process, or blended with the resultant product of such process after its completion.

Details of my preferred process are described more particularly hereafter, and in the drawings representative apparatus suitable for use in the performance of such process is illustrated.

The figure of the drawings is a top perspective view of apparatus which may be used in conjunction with my process, elements of it being shown rather diagrammatically and parts being broken away to disclose features of its construction.

The process of reclaiming waste sulfite liquor and treating it to produce a derivative of the type to which this invention pertains consists generally of heating the sulfite liquor, preferably to the boiling point, and at intervals during such heating process adding reactive ingredients to it. The first step during such heating process, following its concentration to greater or lesser extent, if desired, is to alkalize the liquor with a caustic alkali, such as sodium or potassium hydroxide.

In the example of the suitable process to which my Patent 2,585,977 mentioned above relates, after the alkalized liquor has been treated for a length of time sufficient to render it uniform the aldehyde furfural is added to the liquor. Again the heating is continued for a time sufficient to insure the substantial completion of the reaction between components of the liquor and the added aldehyde. For certain purposes the product obtained from the treatment of the waste sulfite liquor to this point may be utilized as a binder, such, for example, as in the manufacture of low density fibrous products from woody fibers impregnated with such binder.

If desired, the process may be continued, and while the liquor is still hot, phenol can be added to it. The resulting product has excellent water-proof and binding qualities, suitable either for use in making fiber products, such as hardboard or synthetic lumber, by admixture with fibrous woody material, or as an adhesive for veneer in the manufacture of plywood or furniture.

This product can also be used as the base for a synthetic material capable of use as a substitute for natural rubber, as will be explained in greater detail hereinafter.

In an alternative process the phenol and furfural are added simultaneously to the alkalized sulfite liquor, and may have been mixed together before thus being added, or the phenol is added to the alkalized sulfite liquor first and subsequently the furfural is added. When the furfural is added to the alkalized sulfite liquor simultaneously with the phenol or subsequently to its addition to the alkalized sulfite liquor, no ebullition occurs. Moreover, the product resulting when the mixture of alkalized liquor, phenol and furfural in this instance is heated for a time is not a heavy or viscous liquid, as is the product of the alkalized sulfite liquor and furfural reaction discussed above, or the product where, after such reaction, phenol is added in a subsequent step. On the contrary, the bulk of the mixture increases and forms a colloid of thin gelatinous consistency instead of being a viscous resinous liquid.

When to the colloid product of this alternate procedure a ketone, such as acetone, methylethylketone, methyl-isopropyl ketone, methyl-butyl ketone, methyl-iso-butyl ketone, or methyl-benzyl ketone, is added, however, the water phase of the mixture is separated from the viscous portion so that a viscous resinous liquid comparable to that obtained from the first process described settles and the water rises.

It is possible to treat waste sulfite liquor in the manner described generally above in a batch process, but this is comparatively slow, because after treatment of one batch has been completed, the heating of the new batch must be started and the various steps described must be performed sequentially before a further batch can be treated. Preferably the process steps are carried out simultaneously on various portions of liquor passing step-by-step through apparatus, such as from one container to the next, one step of the process being performed in each container.

The apparatus shown in the drawing includes a storage reservoir 1 for waste sulfite liquor from which it may be drained through a pipe 10 continuously at a rate which may be determined by adjustment of the valve 11 in that pipe. The liquid in flowing out of the pipe preferably is discharged from a header 12 perforated along its lower side, which extends along one edge of a heated concentrating device or vaporizer 2.

The concentrating device includes a shallow pan 20 inclined from its edge beneath header pipe 12 gently downwardly to its discharge opening 21. Preferably the discharge opening extends entirely across the lower edge of the pan, or nearly so, and the size of its opening may be regulated by suitable means (not shown) if desired. The bottom sheet of the pan is heated by hot fluid, steam for example, circulated through a lower chamber 22 of the vaporizer 2 beneath the pan 20. The hot fluid may be supplied to such chamber through a pipe 23 and exhausted through a pipe 24, so that the hotter fluid will pass beneath that portion of the pan adjacent to the discharge opening 21, although the direction of circulation is optional. The fluid may be released into the heating chamber, or circulated through it confined in heating coils, as may be preferred.

Because the header 12 distributes the sulfite liquor over substantially the entire width of the vaporizer pan 20, it will flow in a thin sheet downwardly to the discharge opening 21 at a velocity determined by the angle at which the pan is tilted. Preferably passage over the pan will require not less than 10 minutes, and should be at least sufficient to raise the temperature of the liquor to its boiling point. During this passage preferably a substantial portion of the water will be evaporated from the sulfite liquor, the amount depending upon the temperature of the sheet, the velocity of the liquid over it, and the quantity of flow regulated by the adjustment of valve 11, although such concentration of the liquor is not essential. The resulting steam and fumes, such as sulfur dioxide and of terpenes vaporized, will be collected by the hood 25 covering the pan 20, and will be conducted by pipes 26 out of the pan to remove objectionable vapor.

The more or less concentrated liquor flowing out of the pan 20 through the discharge opening 21 is deposited in one end of a tank 3 which has a plurality of parallel partitions 30, alternate partitions projecting from opposide sides of the tank across the major portion of its width to form a serpentine trough for flow of the liquor from its inflow end adjacent to vaporizer 2 to a discharge opening 31 at its opposite end. During the passage of the liquor through this trough, its heating is continued by circulating hot fluid, such as steam, through a compartment 32 beneath the tank 3. Such fluid may be supplied to this chamber through a pipe 34 and discharged from it through a pipe 35. Again such fluid may be released directly into the chamber, or circulated through heating coils. Preferably this tank is substantially horizontal so that the liquor will fill the serpentine trough to a considerable depth controlled by the height of the weir at the entrance to the outlet 31.

To the liquor in tank 3 caustic alkali is added in controlled amount, preferably being supplied near the inflow end of its serpentine trough. The caustic may be stored in a container 36 from which it is fed through pipe 37 into the tank in an amount controlled by regulation of valve 38. From such tank the hot alkalized liquor is poured into a vat 4 through the discharge spout 31'. This vat is heated by hot fluid, such as steam, supplied through a pipe 40 to the space 41 between inner and outer walls of the vat, from which jacket space the fluid is discharged through pipe 42. While in this vat, the liquor not only is heated, but is stirred continuously by the paddles 43 of an agitator, which are carried by a rotary shaft 44.

In accordance with the process described in my aforesaid Patent No. 2,585,977, to the liquor heated in vat 4 is added the aldehyde. Conveniently this can be stored in a supply tank 47 and dispensed at will through pipe 48, in quantities controlled by valve 49 in such pipe, into the trough 31' to mix with the liquor as it flows into the vat. The contents preferably are heated to boiling temperature, substantially that of water, and the agitation is continued until the interaction of the aldehyde and liquor components is complete, the time required being between five and thirty minutes. Ebullition occurs during the reaction between the alkalized sulfite liquor and furfural in the absence of phenolic bodies. Completion of this reaction is indicated by change in color of the liquor from practically colorless to a light brownish tint. In accordance with the alternative process described above, a mixture of phenol and aldehyde, such as furfural, or phenol first and later the aldehyde may be added to the alkalized sulfite liquor while being heated and agitated in the manner described. As the heating and stirring continues the bulk of the liqud increases and takes the form of an aqueous suspension or colloid in contrast with the product of the alkalized sulfite liquor and aldehyde in the absence of phenolic bodies, which becomes a smooth, heavy liquid.

Since vat 4 is part of a continuous treatment apparatus, liquid is withdrawn continuously through the outlet pipe 45 controlled by opening valve 46 in carrying out the method of the type described in my previous application. Its separation from the rest of the liquid is effected by gravity. The upper paddles of agitator 43 propel liquid upward, whereas lower paddles on it (not shown) propel liquid downward, forming two zones of circulation. As the cooking progresses the heavier reaction products settle to the lower zone from which they are drained through the outlet. The time of treatment is established by the rate of inflow through spout 31, the valve 46, after the vat is full, being regulated to maintain the height of the liquid in the vat constant.

The liquid removed from vat 4 may be used in that form as a binder for low specific gravity, woody fiber products, such as wall board of insulating type which is not intended to withstand appreciable mechanical stresses. Preferably, however, the liquid is processed further by discharging it from the outlet 45 of such vat into a second vat 5 similar in character to the vat 4. This vat also is steam jacketed, or jacketed for heating by other hot fluid, supplied to the jacket through pipe 50 and discharged from such space through pipe 51. This vat likewise is provided with an agitator, including paddles 52 carried by rotary shaft 53.

The liquid again is heated and maintained substantially at its boiling temperature, which will still be approximately the same as that of water, and during such heating phenol is added to the liquid and stirred into it by the agitator. Such phenol must be heated to keep it fluid if it is to be added in liquid state. A heated or steam-jacketed tank 56 may serve as a reservoir for it, and the phenol supplied from it through pipe 57 may be deposited in a trough 58 through which liquid from the discharge spout 45 of vat 4 flows into vat 5, to mix with such liquid. The amount of phenol added is controlled by valve 59.

The reaction between the phenol and ingredients of the liquid again requires five to thirty minutes for completion, and the agitator 53 is constructed so that its upper blades force liquid upward and its lower blades force liquid downward to segregate the heavier phenol reaction products from the partially reacted portion of the vat liquid. Finally the resulting liquid, having a purple or reddish color characteristic of phenol, is drained from the vat through outlet 54, controlled by valve 55 to maintain the liquid in the vat at a constant level. It constitutes a resinous binder or filler having excellent binding qualities when set by the application of heat and which is highly water resistant. It may be used to bind woody fibers in the manufacture of high density fiberboard, called synthetic lumber or hardboard, or other fiber products having a specific gravity of .9 or higher.

Where the apparatus is used to carry out the alternative process mentioned above, it is operated somewhat more on the batch principle. No tank is required and the valve 46 will be closed, allowing a full tank 4 of alkalized sulfite liquor, phenol and aldehyde to accumulate, at which time valve 11 will be closed. There will then be added to vat 4 sufficient ketone to separate the water phase of the liquid from the synthetic resin phase, so that the former will rise to the top and the latter will settle to the bottom, enabling it to be drawn off through the pipe 45. When the vat has been emptied the valve 11 will be opened and the vat 4 will be refilled. Such a batch operation of the apparatus is not particularly objectionable because separation of the resin and water phases does not take long after addition of the ketone.

The product of this alternative process is entirely comparable to the material resulting from the treatment in vat 5 as described in my Patent 2,585,977, and may be used in the way described in that patent, mixed with woody fibrous material, for making woody fiberboard, molded products, heat-setting moldable plastics, and utilized in the manufacture of varnish or plastic paint. Moreover, for moldable plastics the liquid of this alternative process may be concentrated by centrifuging, precipitation, or both. Thus, if an acid is added to the liquid, for example hydrochloric acid, in an amount of one to three percent by weight, a precipitate having excellent thermosetting properties, when used as a molding substance, after washing and drying, will be produced. The addition to the liquid of not more than one percent by weight of ammonium chloride alone, or accompanied by not more than one-half percent by weight of resorcinol will enable as much as eighty percent by weight of the treated liquor to be concentrated by centrifuging into a viscous concentrate or paste.

When the derivative is to be used as a synthetic rubber product, the material of the continuous process discharged from vat 5 or of the alternative process from vat 4 is treated further. Such material, for example, may be boiled in a closed container which may be somewhat evacuated to encourage evaporation and recondensation. During such boiling formaldehyde and a ketone can be added, such as acetone or methylethylketone, to produce a thick mass which may be thick enough to solidify on cooling.

If this product is then treated by the addition of Thiokol, such as the product of Thiokol Corporation designated LP2, which is a latex-like liquid organic polysulfide polymercaptan polymer, such as described in the Patrick and Ferguson Patent No. 2,466,963, a rubberlike mass or an elastomer will be formed, capable of being vulcanized by vulcanization processes like those used to vulcanize natural rubber. A representative formula is

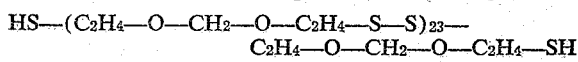

as stated on page 2 of the publication "Thiokol" Liquid Polymer LP-2 of Thiokol Corporation designated LP-2–17.2 revised January 20, 1949.

While the quantities of material added to the waste sulfite liquor during the recovery process described may be varied considerably, the caustic alkali used in the initial treatment should be between five and fifteen percent of the concentrated liquor by weight, the aldehyde up to about fifteen percent by weight of the concentrated and alkalized liquor going into vat 4, and the phenol up to about ten percent by weight of the treated liquid flowing into vat 5 in the first process. In other words, substantially equal amounts by weight of aldehyde and phenol are preferred. Similarly, in the second process described above where the phenol is added first, or the phenol and aldehyde are mixed together and then added simultaneously, again substantially equal weights of phenol and aldehyde are preferred, the weight of each being about fifteen percent of the weight of the concentrated and alkalized liquor going into vat 4. This process, it will be recalled, requires also the addition of a ketone, and the quantity of such ketone should be approximately one and one-half to five percent by weight of the concentrated alkalized sulfite liquor flowing into vat 4.

A specific example of a treatment process in accordance with that first described above which has proved to be quite satisfactory employs the following quantities and times: 100 pounds of raw waste sulfite liquor are heated and boiled at atmospheric pressure for about 15 minutes, during which boiling 5 pounds of sodium hydroxide are added, after which the boiling is continued for at least about 5 minutes; 5 pounds of furfural is added to the alkalized and concentrated liquor and the boiling is continued for a still additional 5 minutes while the liquid is agitated. If enhanced binding and water repellant qualities are desired, the boiling is continued for another 5 minutes after 5 pounds of commercial phenol has been added. Similar times, temperatures and quantities of ingredients are suitable in carrying out the second process described, the only difference being in the sequence in which the ingredients are added. Also, in the manner described previously, addition of a ketone is required.

Utilizing the end product of the examples where phenol and furfural are included in the mixture given immediately above in the manufacture of wallboard or other fibrous synthetic lumber product, 16 pounds of the resulting binder may be mixed with 100 pounds of woody fibrous material containing its natural moisture, and from this material a fiber sheet is formed and pressed under heat and pressure according to known methods.

As representative of a typical use of the binder material obtained from vat 4 in carrying out the first process described where no phenol has been added up to this point, the following example is presented. 1200 parts of wood fiber containing its natural moisture has mixed with it 30 parts of alum dissolved in 200 parts of water, all by weight. With this fiber mass is mixed a solution of 200 parts of the liquid binder diluted with 400 parts of water. The fibrous material thoroughly impregnated by suitable mixing technique with the binder is formed into a mat and then pressed under a pressure of 175 pounds per square inch at a temperature ranging from 285 to 340 degrees F. The length of time such heat and pressure are applied depends upon the thickness of the mat and of the resulting board. For a mat to produce a board ⅛ inch thick, ten minutes will suffice, whereas if the mat is sufficiently thick to produce a quarter inch board the time required will be 20 minutes.

In an otherwise similar wallboard manufacturing process the strength and water resistant qualities of the board may be increased substantially if binder drained from vat 5 made in accordance with the first process described, or from vat 4 made in accordance with the second process described where a ketone has been added, is utilized in the same proportions stated above instead of the intermediate product obtained from vat 4. The tensile strength of the board resulting from the use of these processes may be increased if 50 parts of sodium silicate by weight are added to the binder obtained from vat 4 or from vat 5.

As an alternative to the sodium silicate modification, a stronger and more water resistant board than obtained by use of the binders from vats 4 and 5 unmodified may be produced by substituting for the intermediate product from vat 4 or the final product from vat 5 the same quantity of precipitate resulting from acidulation of the binder or of concentrate from centrifuging.

A further example of a fiberboard making process by which a board smooth on both sides may be produced, for example of 1/16-inch thickness, is cited: 100 parts of dry wood fiber material are mixed with 16 to 33 parts of the binder liquid obtained from vat 5 by weight where the first process has been utilized, that is, where the aldehyde reaction is completed first and the phenol is added thereafter, or obtained from vat 4 in the manner described in accordance with the second or alternative process where the phenol and aldehyde are added together and a ketone is used. A mat of this mixture can be pressed for ten minutes at a pressure of 200–400 pounds per square inch and a temperature of 285 to 340 degrees F., and thereafter the pressure can be reduced gradually to zero. The temperature of the platens may remain substantially constant throughout the pressing operation.

In the fiberboard making process described above it is preferred that a catalyst be used with the binder, such as approximately 0.8 part of paraformaldehyde for each 100 parts of binder, which in the foregoing example would require from one-eighth to one-quarter part of paraformaldehyde, depending upon the amount of binder used in the mixture. Instead of paraformaldehyde approximately five times as much resorcinol by weight can be used instead.

For bonding veneer in the manufacture of plywood, binder drained from vat 5, made in accordance with the first process described, or from vat 4, made in accordance with the second process described where a ketone has been added, may be mixed with commercial thermosetting phenol-formaldehyde resin of a type conventionally used in the manufacture of plywood. Preferably approximately equal parts of sulfite liquor resin and such phenol-formaldehyde resin are mixed together. To this mixture of binders is added from two to three percent of flake sodium hydroxide by weight of the sulfite liquor derivative, for the purpose of rendering it compatible with the phenol-formaldehyde resin. Alternatively, from three to five percent of the sulfite liquor binder component by weight of paraformaldehyde may be used. This plywood glue may be spread in the conventional manner by the usual veneer glue spreader, and the plywood formed in a hot press operating at a temperature of 300° F. and 175 pounds per square inch pressure for a period of five minutes, for example. If desired, a somewhat lower temperature, for example 275° F., may be employed, in which event it may be necessary to heat the product for a somewhat longer period. The temperature, pressure and time for setting the glue is not particularly critical and is in accordance with conventional plywood manufacturing technique.

It has been found that the combination of sulfite liquor derivative and thermosetting phenol-formaldehyde resin of a type conventionally used in the manufacture of plywood is much more stable than phenol-formaldehyde resin alone, so that in the mixed form it can be used after standing for a number of hours, sometimes as much as twenty-four hours, whereas phenol-formaldehyde resin to be sufficiently effective must be applied and subjected to heat sufficient to effect its setting within a fraction of an hour, usually approximately one-half hour, in order to have sufficient strength.

Where it is desired to have a colored fiberboard product such color may be incorporated in the fiber mixture by combining pigment with the resin. It has been found, however, that the colors produced by mixing metallic pigment with thermosetting phenol-formaldehyde resin alone of a type conventionally used in the manufacture of plywood are inclined to fade readily. When the pigment is mixed with a minor proportion of sulfite liquor derivative, however, whether of the type produced by the first or second process described, the pigment is rendered compatible with the phenol-formaldehyde resin. It is desirable to use a major proportion of thermosetting phenol-formaldehyde resin and a minor proportion of sulfite liquor derivative, because the former is relatively light in color whereas the latter is dark in color, and if too much were used it would tend to mask the effect of the pigment.

As specific examples, approximately one-half as much metallic oxide pigment as of sulfite liquor derivative by weight is employed and the mixture of pigment and sulfite liquor derivative is then mixed with from five to ten times the amount of thermosetting phenol-formaldehyde resin by weight. A typical pigment is chromium oxide. In order to insure thorough blending the combination of pigment and sulfite liquor resin should be stirred with such phenol-formaldehyde resin for an hour or so. For stronger colors more pigment is used, such as a weight equal to or even somewhat greater than the weight of sulfite liquor derivative.

In using the binder thus colored in the manufacture of fiberboard the same proportion of such colored binder as previously proposed for unpigmented binder may be mixed with the woody fiber material. Various commercially available colors, including red, green, blue, or appropriate color mixtures, have proven to be quite stable in fiberboard against bleaching or darkening when mixed with sulfite liquor derivative, whereas almost invariably the color of such board has faded or darkened where the pigment was utilized with phenol-formaldehyde resin alone.

In the production of an elastomer material, to the product of the first process removed from vat 5 or the product of the second or alternative process removed from vat 4 a small amount of sodium hydroxide may be added, such as approximately one percent (dry weight) of the weight of sulfite liquor derivative, although this caustic alkali preferably is in aqueous solution containing forty percent solid NaOH. At the same time is added approximately three percent by weight of the sulfite liquor resin of formaldehyde, and this mixture is boiled until complete blending has occurred. If the mixture is too thick water may be added, and, in addition, approximately five percent by weight of the sulfite liquor resin of a ketone is added, such as acetone, methylethyl ketone, methyl-isopropyl ketone, methyl-butyl ketone, methyl-iso-butyl ketone or methyl-benzyl ketone. The mixture is thickened by this addition, and it should be brought to the boiling point to insure complete reaction. On cooling, the resin will solidify. The addition of a small quantity, such as from .01 to .02 of a percent by weight of the sulfite liquor resin, of lead naphthenate or cobalt naphthenate will render the solid of the general consistency of rubber, forming of it an elastomer which can be vulcanized as previously explained.

A more direct method of obtaining an elastomer from waste sulfite liquor concentrated to approximately fifty percent solids in the presence of approximately one percent of flake sodium hydroxide by weight of the raw or original sulfite liquor is as follows. During ebullition five percent approximately of the concentrated sulfite liquor by weight of sodium hydroxide is added, and after ebullition has ceased approximately five percent by weight of the waste sulfite liquor of furfural is added, and heating is continued until ebullition ceases. While the batch is still hot five percent by weight of the condensed sulfite liquor of phenol is added, and the entire mixture is then boiled for two hours in a closed container, as explained previously. Approximately three percent by weight of the condensed sulfite liquor of formaldehyde is then added, and the liquid is boiled in the closed container for another hour. The addition of approximately three percent by weight of the concentrated sulfite liquor of a latex-like liquid organic polysulfide polymercaptan polymer, as previously discussed, may then be added to convert the material to an elastomer as previously explained.

While some variation in the proportions of the various ingredients will not alter the resulting derivative appreciably, the examples given are typical.

I claim as my invention:

1. The method of treating waste sulfite liquor which comprises adding to the liquor caustic alkali, adding phenol and furfural to the alkalized liquor, the phenol being added at least as soon as the furfural is added, heating the resulting liquid and thereafter adding a ketone to such resulting liquid.

2. The method defined in claim 1, in which the ketone is acetone.

3. The method defined in claim 1, in which the ketone is methylethylketone.

4. The method defined in claim 1, including adding formaldehyde to the resulting product, boiling such resulting product and the formaldehyde in a closed container, and adding a ketone.

5. The method defined in claim 4, in which the later ketone added is acetone.

6. The method defined in claim 4, in which the later ketone added is methylethylketone.

7. The method defined in claim 4, in which a latex-like liquid organic polysulfide polymercaptan polymer is added to the resulting product in an amount by weight equal to a few percent of the weight of the sulfite liquor content.

8. The method of treating waste sulfite liquor which comprises adding to the liquor caustic alkali, adding phenol and furfural to the alkalized liquor, heating the resulting liquid, adding formaldehyde and boiling the liquid in a closed container, and adding a ketone to such resulting liquid.

9. The method defined in claim 8, and thereafter adding a latex-like liquid organic polysulfide polymercaptan polymer in an amount by weight equal to a few percent of the weight of the sulfite liquor content.

10. A thermal setting resin binder incorporating the reaction product of phenol, furfural and a ketone with alkalized concentrated sulfite liquor.

11. A vulcanizable elastomer comprising a latex-like liquid organic polysulfide polymercaptan polymer and formaldehyde with the product of phenol and furfural reacted with alkalized concentrated sulfite liquor, the amount of such latex-like liquid organic polysulfide polymercaptan polymer being by weight equal to a few percent of the weight of the sulfite liquor content.

12. A vulcanizable elastomer comprising a latex-like liquid organic polysulfide polymercaptan polymer and formaldehyde with the product of phenol, furfural and a ketone reacted with alkalized concentrated sulfite liquor, the amount of such latex-like liquid organic polysulfide polymercaptan polymer being by weight equal to a few percent of the weight of the sulfite liquor content.

13. The method of making a fiber product comprising mixing a metallic pigment with a thermosetting resin binder incorporating the reaction product of furfural with alkalized concentrated sulfite liquor, mixing such colored resin binder with thermosetting phenol-formaldehyde resin, mixing such combined resin with woody fiber, and molding the resin impregnated fiber mass under heat and pressure.

14. The method of making a fiber product comprising mixing a metallic pigment with a thermosetting resin binder incorporating the reaction product of furfural with alkalized concentrated sulfite liquor, mixing a minor proportion by weight of such colored resin binder with a major proportion by weight of thermosetting phenol-formaldehyde resin, mixing such combined resin with woody fiber, and molding the resin impregnated fiber mass under heat and pressure.

15. The method of making a fiber product comprising mixing a minor proportion by weight of a metallic pigment with a major proportion by weight of a thermosetting resin binder incorporating the reaction product of furfural with alkalized concentrated sulfite liquor, mixing a minor proportion by weight of such colored resin binder with a major proportion by weight of thermosetting phenol-formaldehyde resin, mixing such combined resin with woody fiber, and molding the resin impregnated fiber mass under heat and pressure.

16. The method of making a fiber product comprising mixing a metallic pigment with a thermosetting resin binder incorporating the reaction product of furfural and phenol with alkalized concentrated sulfite liquor, mixing a minor proportion by weight of such colored resin binder with a major proportion by weight of thermosetting phenol-formaldehyde resin, mixing such combined resin with woody fiber, and molding the resin impregnated fiber mass under heat and pressure.

17. A colored thermosetting resin binder comprising a minor proportion by weight of a pigmented thermosetting resin binder embodying the reaction product of furfural with alkalized concentrated sulfite liquor and a major proportion by weight of thermosetting phenol-formaldehyde resin.

18. The binder defined in claim 17, in which phenol is included in the pigmented thermosetting sulfite liquor resin.

19. A colored thermosetting resin binder comprising a pigmented furfural and sulfite liquor reaction product blended with a thermosetting phenol-formaldehyde resin.

20. A fiber product comprising a consolidated mass including discrete pieces of woody material impregnated with a pigmented furfural and sulfite liquor reaction product blended with a thermosetting phenol-formaldehyde resin.

References Cited in the file of this patent

UNITED STATES PATENTS

| | | |
|---|---|---|
| 1,143,714 | Knight | June 22, 1915 |
| 2,585,977 | Uschmann | Feb. 19, 1952 |

FOREIGN PATENTS

| | | |
|---|---|---|
| 476,344 | Great Britain | Dec. 7, 1937 |